United States Patent
Zhang et al.

(10) Patent No.: US 12,191,980 B2
(45) Date of Patent: Jan. 7, 2025

(54) RANDOM ACCESS PREAMBLES IN WIRELESS COMMUNICATION

(71) Applicant: ZTE Corporation, Guangdong (CN)

(72) Inventors: Chenchen Zhang, Guangdong (CN); Wei Cao, Guangdong (CN); Zhen Yang, Guangdong (CN); Kaibo Tian, Guangdong (CN); Nan Zhang, Guangdong (CN)

(73) Assignee: ZTE Corporation, Shenzhen (CN)

(*) Notice: Subject to any disclaimer, the term of this patent is extended or adjusted under 35 U.S.C. 154(b) by 351 days.

(21) Appl. No.: 17/403,605

(22) Filed: Aug. 16, 2021

(65) Prior Publication Data

US 2021/0376946 A1    Dec. 2, 2021

Related U.S. Application Data (63) Continuation of application No. PCT/CN2019/075211, filed on Feb. 15, 2019.

(51) Int. Cl.
| | | |
|---|---|---|
| *H04J 13/00* | (2011.01) | |
| *H04L 27/26* | (2006.01) | |
| *H04W 74/0833* | (2024.01) | |

(52) U.S. Cl.
CPC ...... *H04J 13/0062* (2013.01); *H04L 27/2607* (2013.01); *H04W 74/0833* (2013.01)

(58) Field of Classification Search
CPC ............ H04J 13/0062; H04L 27/2607; H04W 74/0833
See application file for complete search history.

(56) References Cited

U.S. PATENT DOCUMENTS

| | | | |
|---|---|---|---|
| 8,363,608 B2 | 1/2013 | Imamura et al. | |
| 9,622,268 B2 | 4/2017 | Li et al. | |
| 2011/0007627 A1 | 1/2011 | Lee et al. | |
| 2011/0013720 A1 | 1/2011 | Lee et al. | |
| 2012/0131411 A1* | 5/2012 | Mumtaz | H04L 1/0054 714/755 |
| 2017/0094686 A1* | 3/2017 | Ramamurthi | H04L 27/2633 |
| 2018/0375698 A1 | 12/2018 | Zhang et al. | |

(Continued)

FOREIGN PATENT DOCUMENTS

| | | |
|---|---|---|
| CN | 102387599 A | 3/2012 |
| CN | 103988565 A | 8/2014 |

(Continued)

OTHER PUBLICATIONS

International Search Report and Written Opinion mailed on Oct. 29, 2019 for International Application No. PCT/CN2019/075211, filed on Feb. 15, 2019 (6 pages).

(Continued)

*Primary Examiner* — Michael Thier
*Assistant Examiner* — Nevena Zecevic Sandhu
(74) *Attorney, Agent, or Firm* — Perkins Coie LLP (57) ABSTRACT

Methods, systems, and devices for generating preamble sequences where several Zadoff-Chu (ZC) sequences are generated based on multiple roots and multiple cyclic shifts per root and combined to generate the preamble sequences. Some embodiments may be used in wireless communication embodiments in which large propagation delays and/or Doppler movement are expected.

16 Claims, 10 Drawing Sheets

(56) References Cited

U.S. PATENT DOCUMENTS

| | | | |
|---|---|---|---|
| 2019/0239249 A1 | 8/2019 | Sahlin et al. | |
| 2019/0364603 A1* | 11/2019 | Qian | H04L 27/2605 |
| 2020/0100187 A1* | 3/2020 | Balasubramanian | H04L 1/001 |
| 2020/0204421 A1* | 6/2020 | Levinbook | H04L 5/0007 |

FOREIGN PATENT DOCUMENTS

| | | |
|---|---|---|
| CN | 105915315 A | 8/2016 |
| CN | 106464627 A | 2/2017 |
| CN | 108306841 A | 7/2018 |
| CN | 109076602 A | 12/2018 |
| EP | 2704496 B1 | 3/2016 |
| RU | 2572585 C1 | 1/2016 |
| RU | 2630372 C1 | 9/2017 |
| WO | 2009/047732 A2 | 4/2009 |
| WO | 2015190961 A1 | 12/2015 |
| WO | 2017196387 A1 | 11/2017 |
| WO | 2018160111 A1 | 9/2018 |

OTHER PUBLICATIONS

Panasonic et al., "Zadoff-Chu sequence allocation on RACH for complexity reduction," 3GPP TSG-RAN WG1 Meeting #47bis, Sorrento, Italy, R1-070189, 4 pages, Jan. 15-19, 2007.
Qualcomm Europe, "Details on RACH sequence design," 3GPP TSG RAN1 #49, Kobe, Japan, R1-072012, 2 pages, May 7-11, 2007.
European Search Report for EP Patent Application No. 19914877.6, dated Jan. 18, 2022, 7 pages.
Zhen, et al., "Random Access Preamble Design and Detection for Mobile Satellite Communication Systems," IEEE Journal on Selected Areas in Communications, vol. 36, No. 2, Feb. 2018, XP055872810, pp. 280-291.
Zhang, et al., "Random Access Preamble Design for Large Frequency Shift in Satellite Communication," 2019 IEEE 2nd 5G World Forum (5GWF), IEEE, Sep. 30, 2019, XP033665212, pp. 659-664.
CNIPA, Chinese Office Action for Chinese Patent Application No. 201980091386.2 dated Dec. 1, 2022, 14 pages with unofficial translation.
Chinese office action issued in CN Patent Application No. 201980091386.2, dated Jun. 7, 2023, 4 pages. English translation included.
Russian office action issued in RU Patent Application No. 2021126928, dated Jan. 31, 2022, 10 pages. English translation included.
Russian Decision on Grant issued in RU Patent Application No. 2021126928, dated Jun. 1, 2022, 18 pages. English translation included.
European Communication pursuant to Article 94(3) EPC for EP Patent Application No. 19914877.6, dated Mar. 22, 2023, 6 pages.
Chinese Notification to Complete Formalities of Registration issued in CN Patent Application No. 201980091386.2, dated Oct. 8, 2023, 4 pages. English translation included.
European Communication under Rule 71(3) EPC issued in EP Patent Application No. 19914877.6, dated Apr. 5, 2024, 34 pages.

\* cited by examiner

RANDOM ACCESS PREAMBLES IN WIRELESS COMMUNICATION

CROSS-REFERENCE TO RELATED APPLICATIONS

This application is a continuation of and claims priority to International Patent Application No. PCT/CN2019/075211, filed on Feb. 15, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. Non-terrestrial networks (NTN's) are expected to play a significant role in upcoming 5th Generation (5G) New Radio (NR) networks given the wide service coverage capabilities, and the reduced vulnerability of space/airborne vehicles to physical attacks and natural disasters. Non-terrestrial networks will be particularly attractive in un-served or under-served and will be critical to economically bolster the performance of current limited terrestrial networks in such underserved areas.

SUMMARY

This document relates to methods, systems, and devices for generating long preamble sequences by concatenating or superposing two or more short preambles in the time domain.

In one representative aspect, a wireless communication method is disclosed. The method includes generating or otherwise determining Zadoff-Chu (ZC) sequences based on two or more roots and two or more cyclic shifts per root and then generating a long preamble sequence by combining (concatenating, superposing, etc.) the ZC sequences (short preambles). The generated long preamble sequence is then prepended with a cyclic prefix (based on a portion of the tail of the preamble sequence), and a guard time is added to generate a random access preamble that a wireless device (e.g., user equipment (UE)) transmits to a wireless node (e.g., a base station (BS)) during a random access procedure (e.g., during a UE's initial network access). The wireless device selects the cyclic shifts used to obtain the ZC sequences from a set of cyclic shift lists corresponding to each root. The cyclic shift list provides a unique signature in a random access procedure, where the signature pool has an easily extendable capacity depending on the length of the cyclic shift list. By using multiple roots and multiple cyclic shifts, the disclosed technology enables high frequency and time offset estimation at the receiver which is desirable, for example, for non-terrestrial network applications. Additionally, user detection and corresponding frequency/time offset estimation can be carried out on combined short preambles with relatively low complexity.

In another example aspect, a wireless communication apparatus comprising a processor is disclosed. The processor is configured to implement the above-described method.

In another example aspect, a computer program product is disclosed. The computer program product includes a computer-readable medium that stores processor-executable instructions embodying the above-described method.

The above and other aspects and their implementations are described in greater detail in the drawings, the descriptions, and the claims.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology).

In non-terrestrial networks, low earth orbiting (LEO) satellite communication has attracted extensive interests in industry for its potential to support high bandwidth and low latency communication. However, the rapidly moving LEO satellites can result in large frequency offset in transmitted and received signals. Although user equipment (UEs) typically perform a coarse frequency offset estimation when detecting downlink synchronization signals, the residual frequency offset can still be relatively large which introduces new challenges to the random access procedure in non-terrestrial networks. Additionally, potentially large time offsets caused by large propagation delay can exceed the capability of legacy random access preambles, e.g., the LTE Physical Random Access Channel (PRACH) preambles. It is therefore advantageous to have a random access preamble format capable of tolerating large frequency and time offsets when used for a non-terrestrial random access procedure.

In LTE, the Physical Random Access Channel (PRACH) is used to transmit the access request of user equipment (UEs) to the base station (BS). The BS detects the UEs and their time delays according to PRACH preambles, then provides Timing Advance (TA) information to the UEs. The LTE preambles are constructed based on Zadoff Chu (ZC)

sequences (with length of 139 or 839) and cyclic shifts of various lengths. For a given cell, 64 different random access sequences are provided to all UEs. The corresponding root pool and cyclic shift pool (cyclic shift list sets) is broadcasted to all UEs. A UE randomly chooses a root and a cyclic shift to generate its random access preamble signal.

Figure 1:
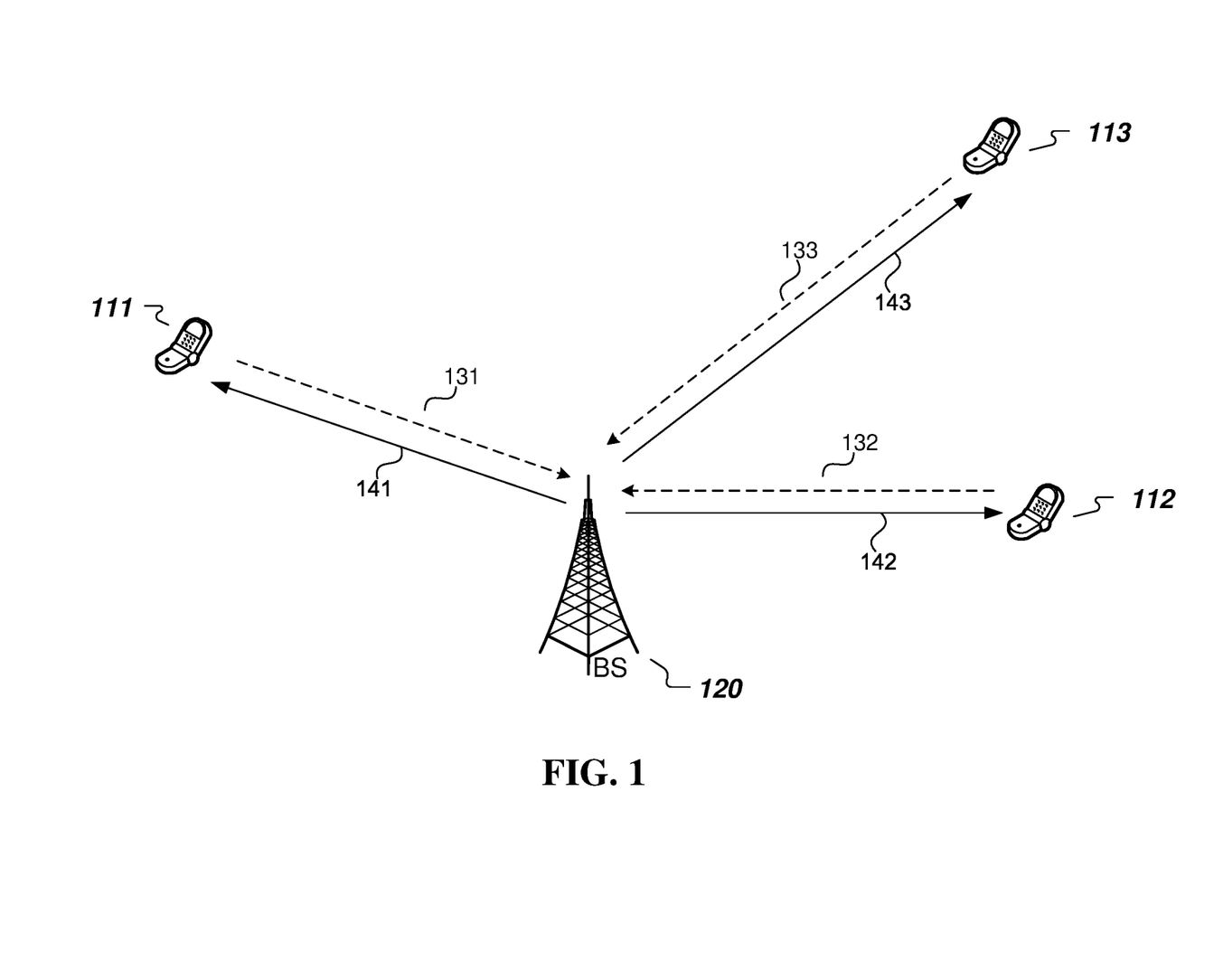
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. The uplink transmissions (131, 132, 133) include random access preambles as described in this document. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

Figure 2:
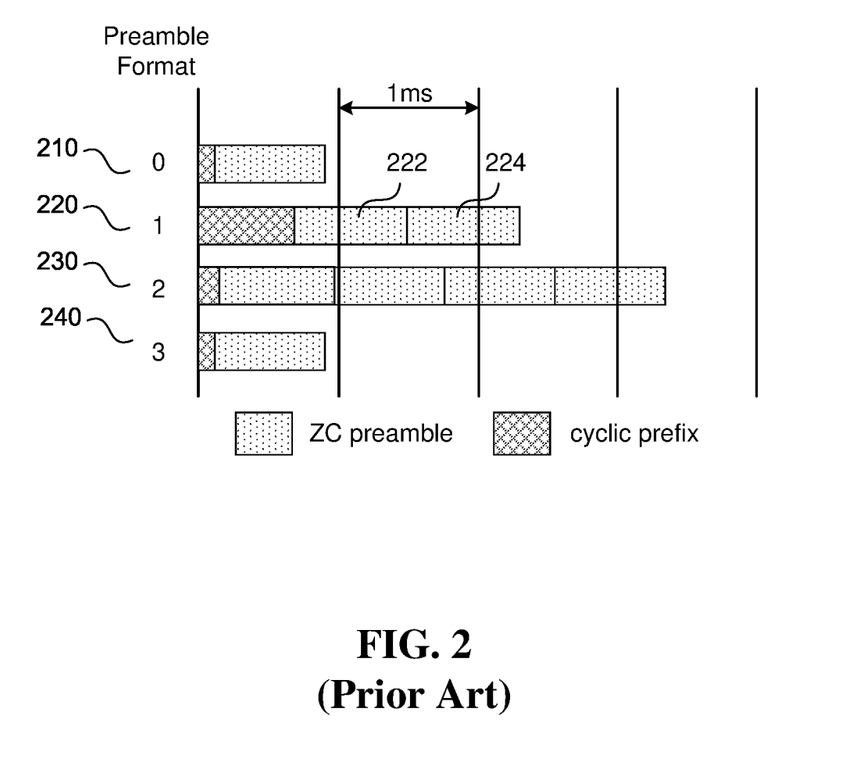
FIG. 2 shows an example of legacy preamble formats.

FIG. 2 shows an example of legacy random access preamble formats, for example, preamble format 0 (210), preamble format 1 (220), preamble format 2 (230), and preamble format 3 (240). Different random access preamble formats are used for signaling in conventional wireless communication systems (e.g., in LTE PRACH random access preambles) to support different base station cell sizes. That is, different random access preamble formats (together with different cyclic prefix lengths as described further below) allow users/UEs at different distances from the base station and travelling at different velocities relative to the base station to reliably synchronize with the base station. For example, to extend the coverage of the base station, one or more random access preamble formats (e.g., preamble format 1, 220, in FIG. 2) can provide for repeating a random access preamble sequence, e.g., sequence 222, to form a sequence 224. The repeated sequences 222 and 224 can then be combined to form a longer random access preamble sequence. However, this technique for obtaining longer random access preambles is deficient in several ways. For example, the conventional preamble formats cannot support frequency offsets larger than a subcarrier spacing (SCS) because the correlation peak used by the receiver to detect the random access preamble can shift substantially due to frequency offsets and it can fall in another UE's detection window. As a result, larger cyclic shift lengths are typically used in high speed scenarios, where high frequency offsets are expected. A different technique other than simple repetition is needed to overcome these and other problems in extending conventional random access preambles for large time and frequency offset. Additional benefits of the improved random access preamble formats will be discussed further below.

Figure 3:
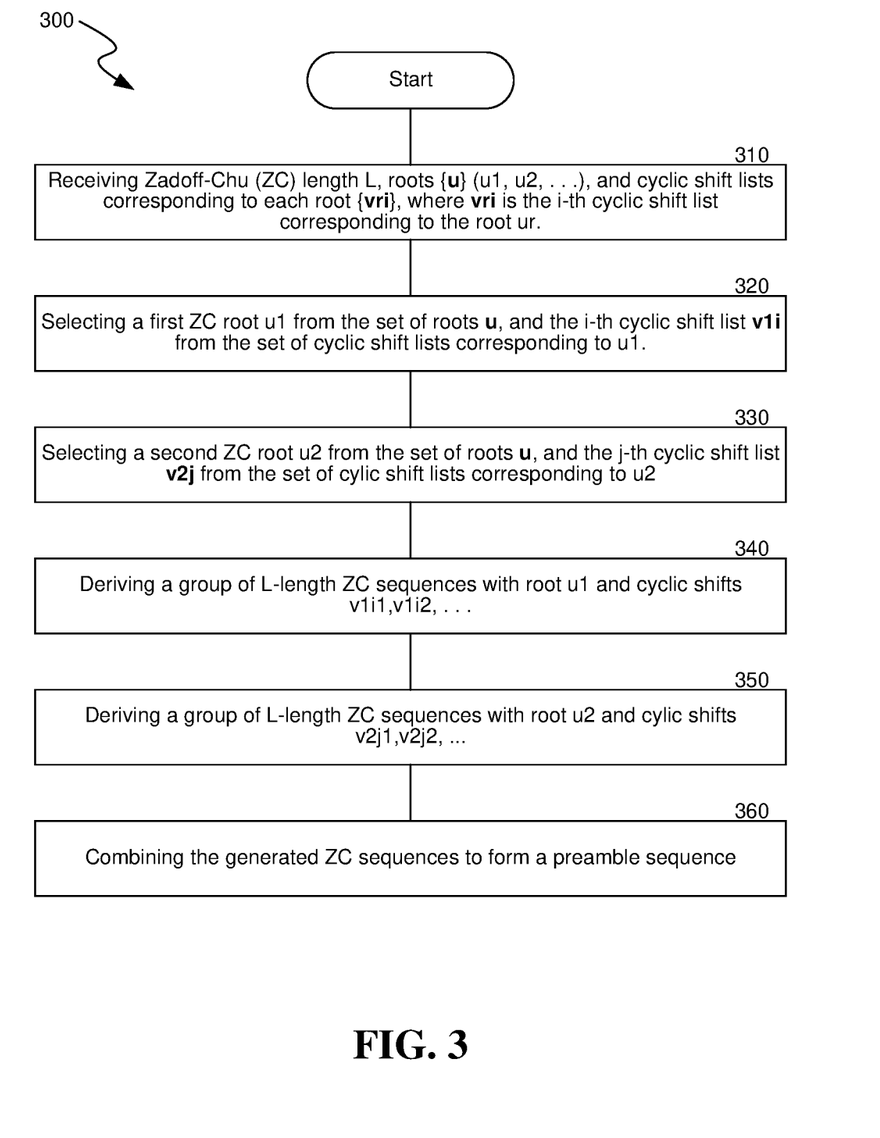
FIG. 3 shows a representative flow illustrating a method for generating preambles.

FIG. 3 shows a representative flow 300 illustrating a method for generating preambles where several ZC sequences are generated, grouped into at least two groups, and combined to generate a preamble sequence. Each group comprises multiple ZC sequences with different cyclic shifts, where the ZC sequences in each group have a unique root. A block 310, the user equipment (UE) receives from the base station the length (L), roots {u}, and cyclic shift lists $\{v_{ri}\}$ that the UE will use to generated Zadoff-Chu (ZC) sequences for the random access preamble sequence; $u=\{u_1, u_2, u_3, \ldots, u_R\}$ are the R roots to allow the UE to generate up to R different root/base ZC sequences, and $v_{ri}$ ($v_{ri1}$, $v_{ri2}$, $v_{ri3}$, ..., where r=root, i=list number) are the set of cyclic shift lists corresponding to each root to allow the UE to generate cyclic-shifted ZC sequences from each root sequence. For example, for the root $u_1$ the UE can receive cyclic shift lists $\{v_{11}, v_{12}, v_{13}, \ldots \}$, where $v_{1i}=(v_{1i1}, v_{1i2}, \ldots)$ is the i-th cyclic shift list corresponding to root $u_1$; for the root $u_2$ the UE can receive cyclic shifts lists $\{v_{21}, v_{22}, \ldots \}$, where $v_{2j}=(v_{2j1}, v_{2j2}, v_{2j3}, \ldots)$ is the j-th cyclic shift list corresponding to root $u_2$, etc. The cyclic shift lists can have the same or different number of elements in different embodiments, and each root can have a different number of cyclic shift lists.

At blocks 320, the UE selects a ZC root ($u_1$) from the set of roots u, and the i-th cyclic shift list ($v_{1i}$) from the set of cyclic shifts lists corresponding to the selected root $u_1$.

At block 330, the UE selects the ZC root $u_2$ and the j-th cyclic shift list $v_{2j}$ from the cyclic shift lists corresponding to the root $u_2$.

At block 340, the UE derives a group of L-length ZC sequence with root $u_1$ and cyclic shifts $v_{1i}$. For example, the UE can generate a ZC sequence with cyclic shift $v_{1i1}$, a ZC sequence with cyclic shift $v_{1i2}$, etc., where the cyclic shifts are obtained from the i-th cyclic shift list (e.g., if the first cyclic shift list for $u_1$ is selected, the cyclic shifts are $v_{111}$, $v_{112}$, $v_{113}$, ..., etc.).

At block 350, the UE derives another group of L-length ZC sequence with root $u_2$ and cyclic shifts $v_{2j}$. For example, the UE generates ZC sequences cyclic shifted by $v_{2j1}$, $v_{2j2}$, ..., etc. (e.g., if the first cyclic shift list for $u_2$ is selected, the cyclic shifts are $v_{211}$, $v_{212}$, $v_{213}$, $v_{214}$, ..., etc.). In some embodiments, the UE can be obtain pre-defined ZC sequences from a memory of the UE such as from a Look-up Table (LUT) using the selected roots and cylic shift list.

At block 360, the UE combines the ZC sequences generated in blocks 340 and 350 to form a preamble sequence. In some embodiments, the UE concatenates the sequences whereas in other embodiments the UE superposes the sequences or combines concatenation and superposition to generate the preamble. The UE can repeat blocks 320-350 to generate additional ZC sequences for additional roots. In some embodiments, a minimum of two ZC sequences are used per ZC root, and a minimum of two ZC roots are used to form the preamble sequence. In general, for multiple roots and multiple cyclic shifts per root, the preamble generated at block 360 can be denoted:

($u_1$, $v_{1i1}$, $v_{1i2}$, ..., $v_{1in_1}$), ($u_2$, $v_{2j1}$, $v_{2j2}$, ..., $v_{2n_2}$), ..., ($u_r$, $v_{rk1}$, $v_{rk2}$, ..., $v_{rkn_r}$) ..., where the first group of ZC sequences uses the ith cyclic shift list corresponding to $u_1$ (and the ith cyclic shift list has $n_1$ cyclic shift values); the second group of ZC sequences uses the jth cyclic shift list corresponding to $u_2$ (and the jth cyclic shift list has $n_2$ cyclic shift values); and the rth group of ZC sequences uses the kth cyclic shift list corresponding to the root $u_r$ (and the kth cyclic shift list has $n_r$ cyclic shift values). The UE uses the generated preamble sequence to generate a random access preamble waveform that it transmits to a wireless node (e.g., a base station) as part of a random access procedure (e.g., for the UE's initial network access, connection re-establishment, handover, etc.).

In some embodiments, as described further below, each cyclic shift list in the set of cyclic shifts lists corresponding to a root r is unique. That is, the ith cyclic shift list of root r does not overlap with the jth cyclic shift list of root r for any cyclic shift s. For example, considering the case where they cyclic shift lists are in increasing order, for any list j≠i, $[(v_{rj1}, v_{rj2}, \ldots)+s] \bmod L \neq (v_{ri1}, v_{ri2}, \ldots)$ for any s.

Figure 4:
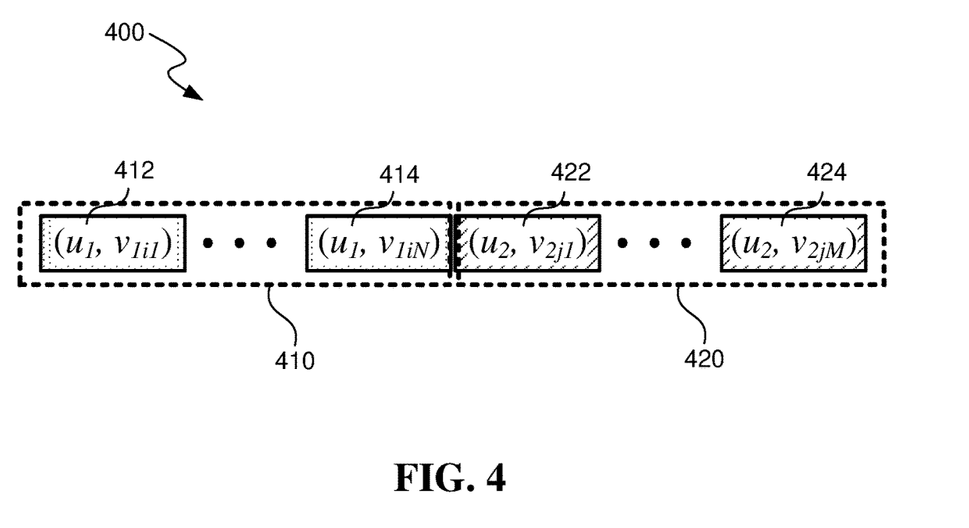
FIG. 4 shows an example of a long preamble generated by concatenating several short preambles.
Figure 11:
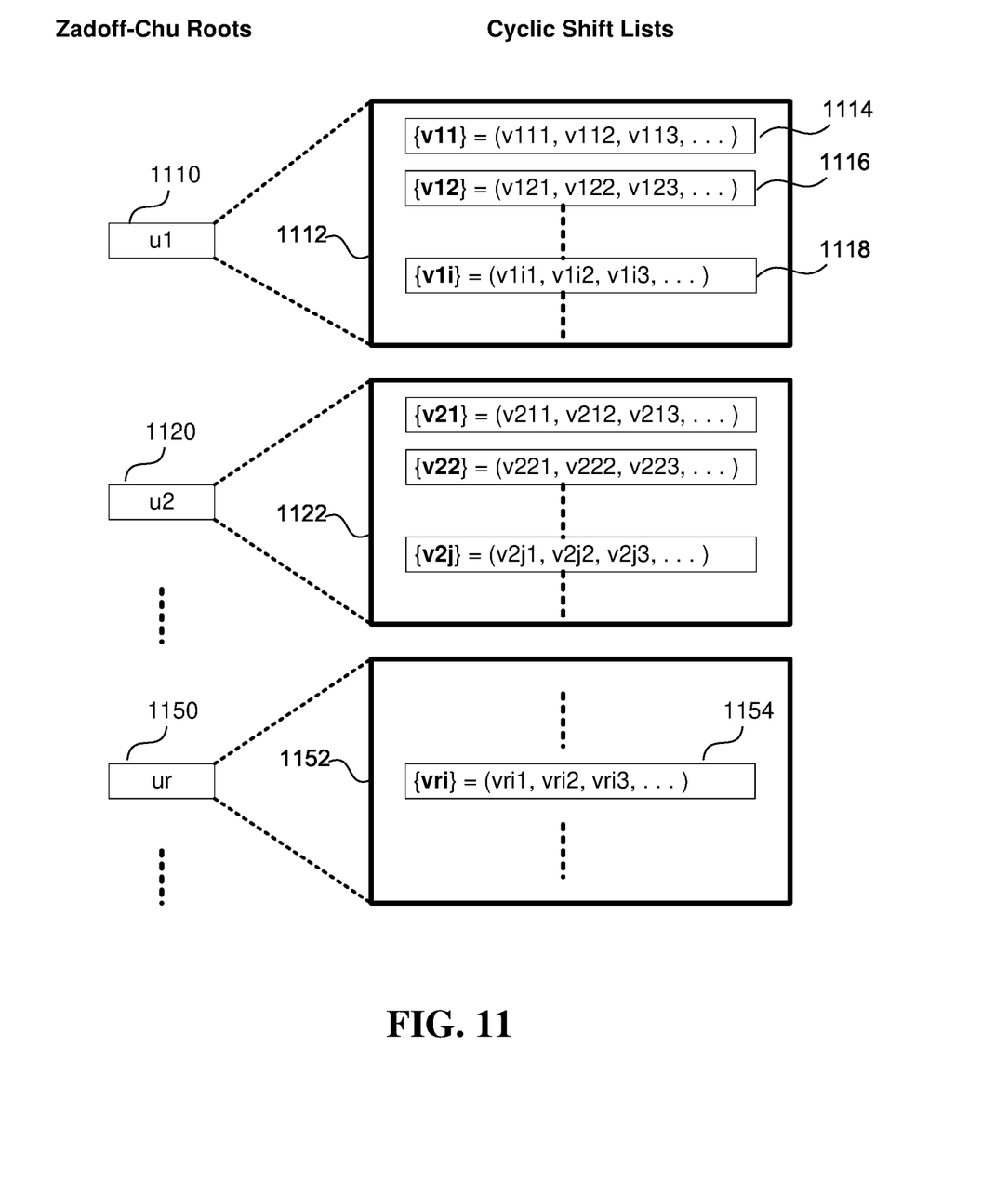
FIG. 11 shows an example set of roots and sets of cyclic shift lists.

FIG. 4 shows an example of a long preamble 400 generated by concatenating several short preambles in the time domain, including preambles 412, 414, 422 and 424. In general, a long preamble such as preamble 400 can be generated by concatenating or superposing $N_{sp}$ short preambles in the time domain. Each of the constituent short preambles (e.g., preambles 412, 414, 422, and 424) are generated from a Zadoff-Chu (ZC) sequence with length L, characterized by root u and cyclic shift v. To generate a long preamble, two or more different roots are used to generate the constituent short preambles (i.e., $N_u \geq 2$). The long preamble can be expressed as:

$$(u_1, v_{11}, v_{12}, \ldots, v_{1n_1}), (u_2, v_{21}, v_{22}, \ldots, v_{2n_2}),$$

$$\ldots, (u_{N_u}, v_{N_u 1}, v_{N_u 2}, \ldots, v_{N_u n_{N_u}})$$

where $n_1+n_2+ \ldots +n_{N_u}=N_{sp}$. Note that the list numbers that the cyclic shifts above correspond to have been dropped for better readability. That is, as discussed in relation to FIG. 11 below, if the first group corresponding to the $u_1$ root selects the i-th cyclic shift list, the first group can be denoted as $(u_1, v_{1i1}, v_{1i2}, v_{1in_1})$.

In the long preamble 400 depicted in FIG. 4, two roots $u_1$ and $u_2$ are used for the constituent short preambles. The first group 410 of short preambles uses root $u_1$. The $u_1$ root sequence is cyclic shifted to obtain $(u_1, v_{1i1}, v_{1i2}, \ldots, v_{iiN})$. For convenience, this is denoted as $(u_1, v_{11}, v_{12}, \ldots, v_{1n})$ in the description below, omitting the cyclic shift list index i. Similarly, the second group 420 of short preambles uses root $u_2$ and the root sequence is cyclic shifted to obtain $((u_2, v_{2j1}, v_{2j2}, \ldots, v_{2jm})$. For convenience, this is denoted as $(u_2, v_{21}, v_{22}, \ldots, v_{2m})$ in the description below, omitting the cyclic shift index j. That is, $n+m=N_{sp}$ short sequences are concatenated to form the long preamble 400. In some embodiments, the different ZC sequences can have different lengths.

The preamble format described above uses Nu different roots to overcome the problems discussed above, for example, the inability of conventional random access preambles to detect large frequency offsets such as in non-terrestrial networks (e.g., where the correlation peaks can shift to other user's detection windows leading to wrong receiver detection results). Furthermore, a combination of peaks (corresponding to the cyclic shift lists above) are used to identify a specific user as discussed further below. The long preamble using multiple roots enables high frequency offset estimation at the receiver which is very desirable, for example, in non-terrestrial network applications.

The cyclic shift list $v_{11}, v_{12}, \ldots, v_{1n}$ is a unique signature in random access procedures. The uniqueness lies in the amount of cyclic shift between adjacent sequences in the list, i.e., $v_{12}-v_{11}, v_{13}, -v_{12} \ldots, v_{1(n-l)}-v_{1n}$, for example. Two cyclic shift lists from the same root sequence are identical if they can completely overlap with each other with a cyclic shift s over length L. For example, Table 1 below shows some examples of cyclic shift lists that are identical (i.e., they completely overlap given some cyclic shift s) and cyclic shift lists that are not identical (i.e., they do not overlap for any cyclic shift s).

TABLE 1

| Example cyclic shift list pool ($v_{11}$, $v_{12}$) for a BS where n = 2, L = 839 | Comment |
|---|---|
| (0.23), (0.77) | These cyclic shift lists are not identical. They do not overlap for any s. |
| (0.23), (1.24) | These cyclic shift lists are identical. They overlap for s = 1 because (1.24) = (0.23) + 1. |
| (0.23), (830.14) | These cyclic shift lists are identical. They overlap for s = 830 because (830.14) = [(0.23) + 830] mod 839. |

In the disclosed technology, ZC sequences generated from non-identical cyclic shift lists are concatenated to form long preamble sequences (e.g., preamble 400 in FIG. 3). Additionally, the mapping between cyclic shifts on any two different roots would typically be one-to-one. That is, a selected combination $(v_{11}, v_{12}, \ldots, v_{1n})$ on root $u_1$ would determine the corresponding cyclic shift lists on the remaining roots once the one-to-one mapping is provided. The signature (i.e., cyclic shift list) pool has an easily extendable capacity based on the length of the cyclic shift list.

Figure 5:
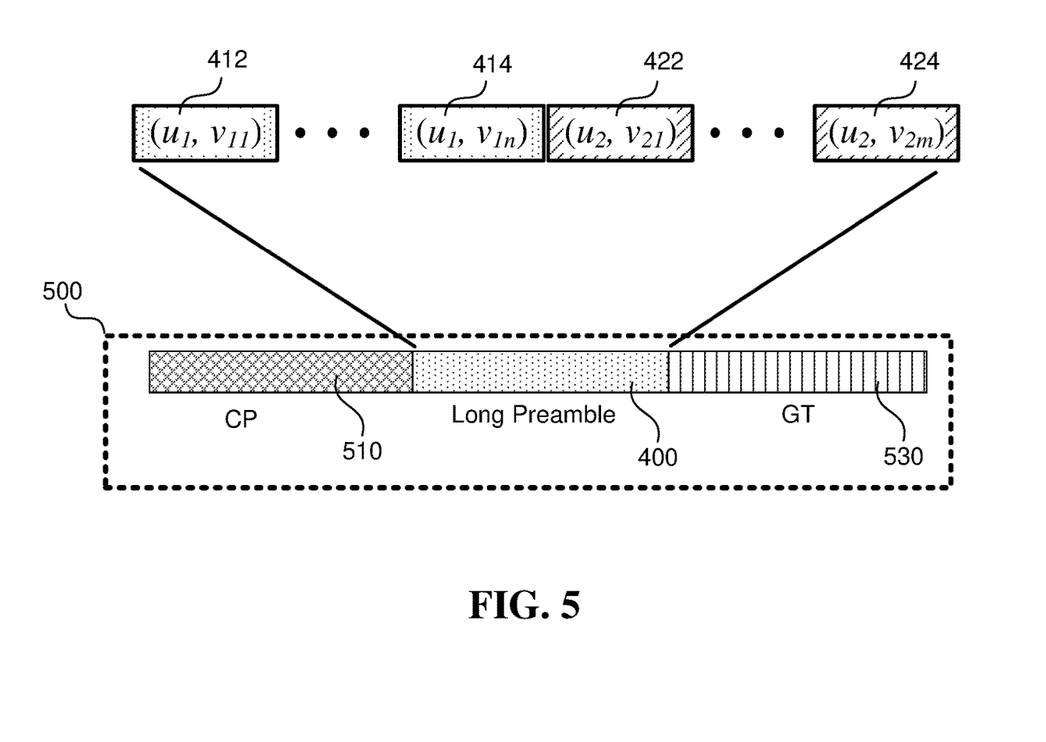
FIG. 5 shows an example of a long preamble including a cyclic prefix and guard time.

FIG. 5 shows an example of a long preamble 500 including a cyclic prefix (CP) 510 and guard time 530. The cyclic prefix 510 is pre-pended to the long preamble 400 by taking a portion of the tail of the long preamble signal. A guard time (GT) 530 is added to the end of the prepended long preamble signal.

Figure 6:
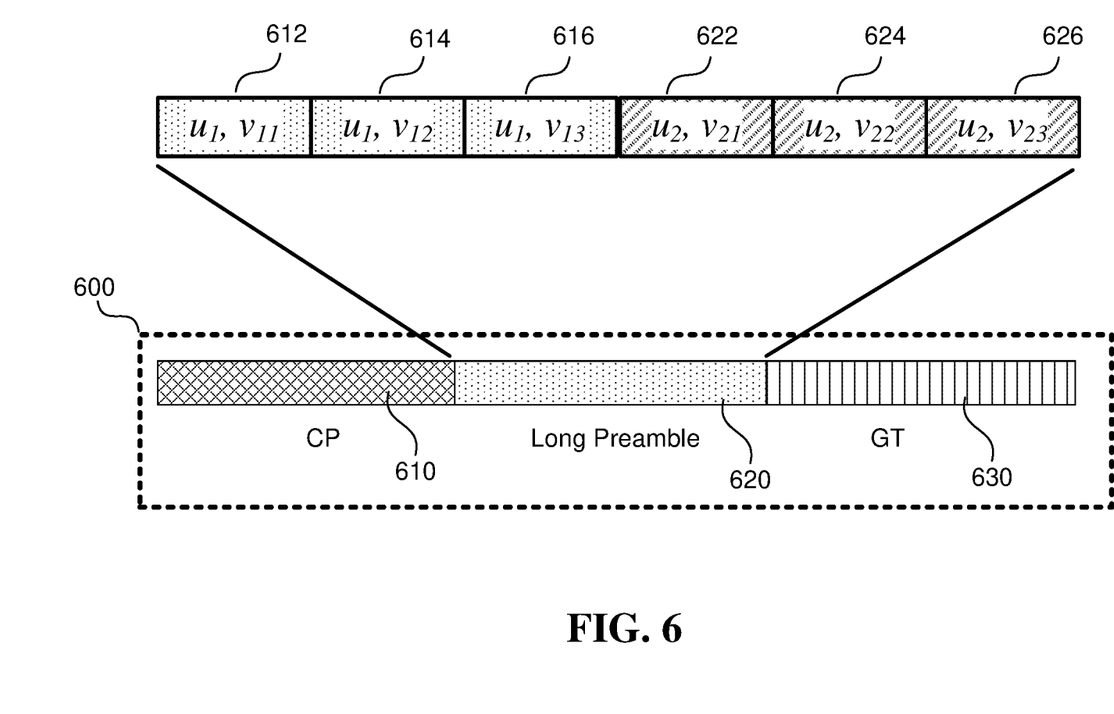
FIG. 6 shows an example of a long preamble for random access in satellite communication systems.

FIG. 6 shows an example of a random access preamble 600 that can be used for random access in satellite communication systems. Satellite communications systems can be characterized by large time delay T and large frequency offset fo. The random access preamble 600 comprises a cyclic prefix (CP) 610, a long preamble sequence 620, and a guard time interval 630. In one embodiment, the subcarrier spacing (SCS) $\Delta f_{RA}$ can be 1.25 kHz, the ZC sequence length L can be 839 resulting in a 0.8 ms duration of each constituent short preamble (e.g., short preambles 612, 614, 616, 622, 624, 626). If, for example, the largest time delay in a certain Low Earth Orbit (LEO) satellite communication system was 4.4 ms, the cyclic prefix (CP) can be generated by prepending the long preamble sequence 620 with a portion from the tail of the long preamble sequence 620 corresponding to six ZC preambles.

Figure 7:
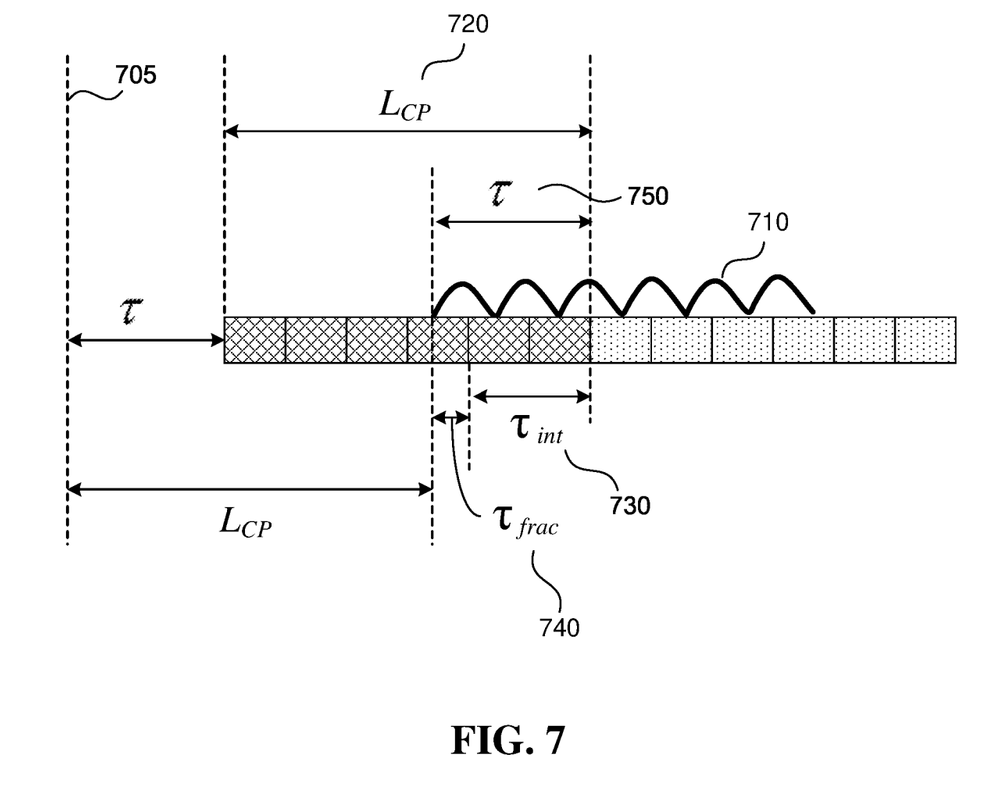
FIG. 7 shows an example set of correlation peaks at a receiver configured to receive random access preambles.

FIG. 7 shows an example set of correlation peaks at a receiver (e.g., a wireless node receiver such as a base station receiver) configured to receive random access preambles transmitted by the user device (e.g., UE) and calculate frequency and time offsets. At the base station (BS) receiver, the time delay $\tau$ 750 can be split into an integer part $\tau_{int}$ 730 (in multiples of 0.8 ms for a 1.25 kHz SCS) and a fractional part $\tau_{frac}$ 740 (i.e., $\tau=\tau_{int}+\tau_{frac}$). Similarly, the frequency offset fo can be split up as $fo=K \cdot \Delta f_{RA}+fo_{frac}$. Marker 705 is the zero-delay receive time and length 720 is the length of the cyclic prefix (CP). The BS receiver superposes the portions 710 and circularly correlates the superposition with short base sequences generated using $(u_1,0)$ and $(u_2,0)$ (where "0" denotes a cyclic shift of zero, and where the random access preamble is generated from two roots $u_1$ and $u_2$ as described in relation to FIG. 6 above). The same integer frequency offset $K \cdot \Delta f_{RA}$ brings different but deterministic peak shifts on the two different roots. In some embodiments, the integer time offset $\tau_{int}$ 730 can be estimated by correlation using a sliding time window, and then the fractional time offset $\tau_{frac}$ 740 and the frequency offset fo can be derived. As a result, user detection and corresponding frequency/time offset estimation can be carried out on combined short preambles with relatively low complexity. The receiver upon detecting the time delay as described above can send a timing advance (TA) value to the user device.

Figure 8:
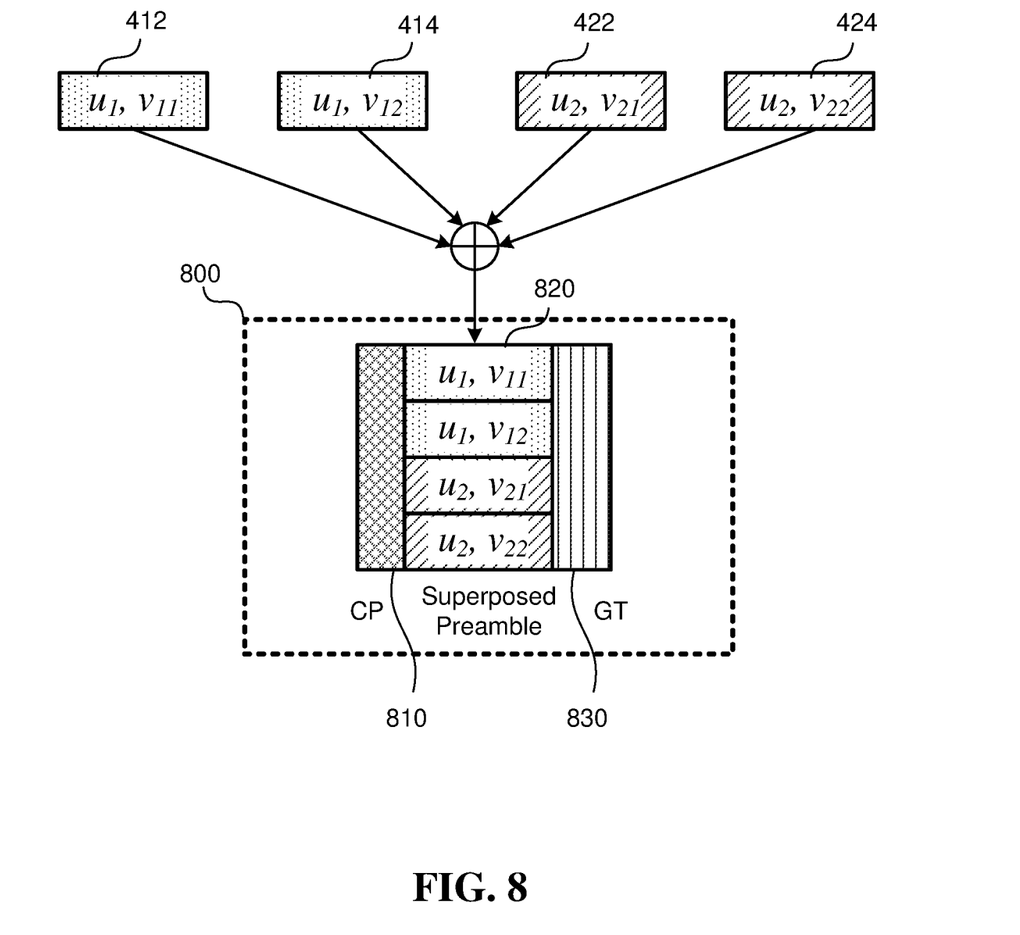
FIG. 8 shows an example of a long preamble for systems with large frequency offset and small time delay.

FIG. 8 shows an example of a preamble 800 for systems with large frequency offset and small time delay. In some embodiments, for example in user devices embedded in or used in airplanes served by wireless nodes (e.g., base stations) on high altitude platforms (HAPs), the propagation delay of signals from the user device to the base station can be much lower than in other applications (e.g., ground-based devices communicating with LEO satellites). However, the frequency offset due to doppler spread can be quite large due to the much higher velocity of the user device relative to the BS. In these and other such systems prone to large frequency offset and small time delay, the preamble 800 of FIG. 8 can be used resulting in less resource consumption. For example, the ZC sequences 412, 414, 422, and 424 can be superposed to generate the superposed preamble 820. Additionally, the preamble 800 can use shorter CP 810 and GT 830 (compared to embodiments requiring detection of larger time delays), where the shorter CP and GP still allows the BS to detect the shorter time delay and the frequency offset (as described in relation to FIG. 7 above).

Figure 9:
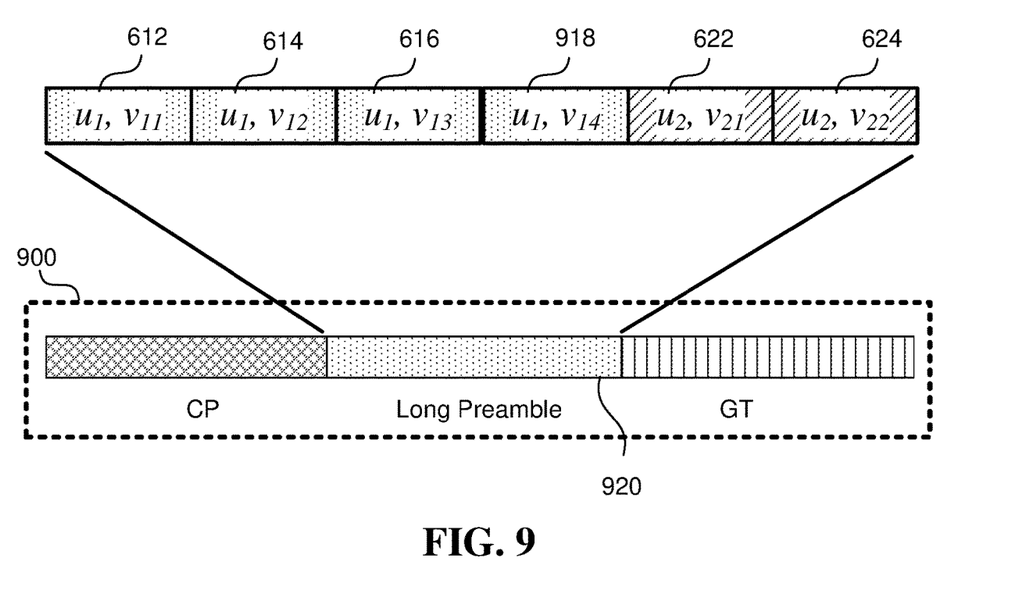
FIG. 9 shows an example of an asymmetric long preamble.

FIG. 9 shows an example of a preamble 900 comprising an asymmetric long preamble 920. For example, preamble 920 can concatenate four root $u_1$ preambles 612, 614, 616, and 918, and two root $u_2$ preambles 622 and 624 (compare with FIG. 6's symmetric preamble structure of three root $u_1$ preambles and three root $u_2$ preambles). The base station receiver can calculate time delay and frequency offset according to description above (in relation to FIG. 7) if the characteristics on the roots and cyclic shift lists are as described above.

Figure 10:
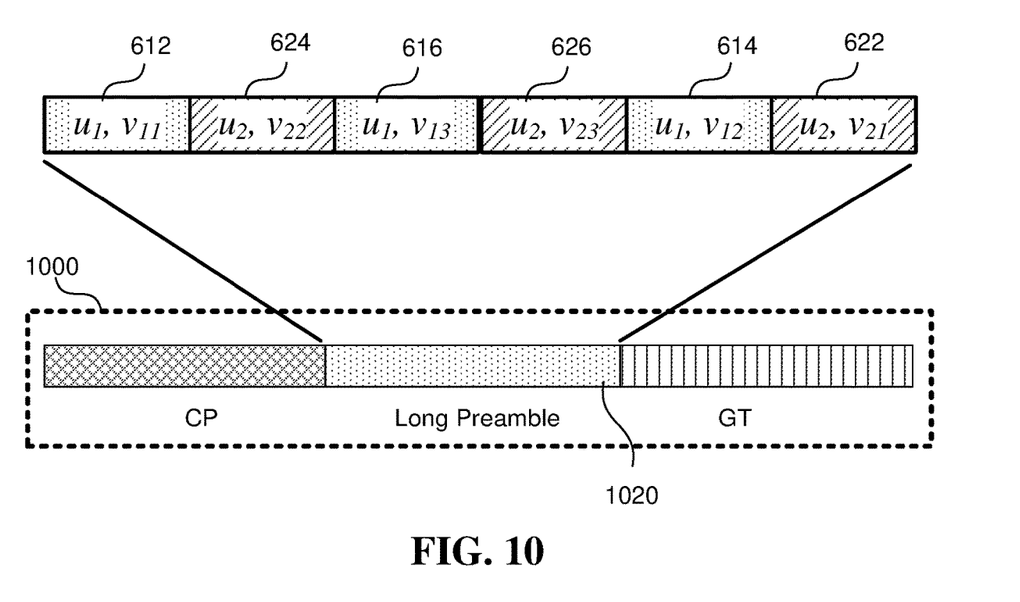
FIG. 10 shows an example or reordered short preambles.

FIG. 10 shows an example of a preamble 1000 comprising a long preamble 1020 where the constituent ZC sequence groups 612, 624, 616, 626, 614, 622 are concatenated or superposed in a different order from the example of FIG. 6. For example, in FIG. 10 each short root $u_1$ preamble is followed by a short root $u_2$ preamble in an alternating manner (root $u_1$ preamble 612 is followed by a root $u_2$ preamble 624 which is followed by a root $u_1$ preamble 616, etc.). Conversely, in FIG. 6 the root $u_1$ preambles (preambles 612, 614, and 616) are grouped together and followed by a group of root $u_2$ preambles (preambles 622, 624, and 626). That is, the order of the short preambles does not affect the calculation of frequency offset and time delay (as described in relation to FIG. 7 above).

FIG. 11 shows an example set of roots (e.g., root $u_1$ 1110, $u_2$ 1120, and $u_r$ 1150); cyclic shift lists sets corresponding to the roots (e.g., cyclic shift lists set 1112 corresponding to the root u1 1110, cyclic shift lists set 1122 corresponding to the root u2 1120, and cyclic shift lists set 1152 corresponding to the root ur 1150). Each of the cyclic shift lists set contains several cyclic shifts lists. For example, cyclic shift list set 1112 contains cyclic shift lists v11 1114, v12 1116, ..., v1$i$ 1118, ..., etc. The ith cyclic shift list vri 1154 corresponding to the rth root contains the M elements $v_{ri1}$, $v_{ri2}$, $v_{ri3}$, ... $v_{riM}$, where each of the elements corresponds to a cyclic shift value.

Some example embodiments may be described using the following clauses.

Clause 1. A wireless device generates a preamble sequence by combining a plurality of Zadoff-Chu (ZC) sequences. The plurality of ZC sequences is based on two or more roots and a cyclic shift per root. The wireless device (e.g., a UE) can then generate a transmission waveform using the preamble sequence and transmit it to a wireless node (e.g., a BS). Combining can be concatenating, superposing, or a combination of concatenation and superposition.

Clause 2. To generate the preamble sequence the UE receives a length L, a plurality of roots u1, u2, u3, ..., and a plurality of cyclic shift lists sets corresponding to the plurality of roots. Each cyclic shift lists set comprises a plurality of cyclic shift lists. It can then select a first root u1 and an ith cyclic shift list v1$i$, wherein the first root u1 is selected from the plurality of roots, and the ith cyclic shift list v1$i$ is selected from a plurality of cyclic shift lists v11, v12, v13, ..., corresponding to the first root u1; and a second root u2 and a jth cyclic shift list v2$j$, wherein the second root u2 is selected from the plurality of roots, and the jth cyclic shift list v2$j$ is selected from a plurality of cyclic shift lists v21, v22, v23, ..., corresponding to the second root u2; and so on for the rth root ur and kth cyclic shift list v2$k$. The ith cyclic shift list v1$i$ corresponding to the first root u1 comprises N cyclic shift values, v1$i$1, v1$i$2, v1$i$3, ..., v1$i$N, and the jth cyclic shift list v2$j$ corresponding to the second root u2 comprises M cyclic shift values, v2$j$1, v2$j$2, v2$j$3, ..., v2$j$M. The UE can then generate a first group of N ZC sequences of length L based on the first root u1 and the ith cyclic shift list v1$i$={v1$i$1, v1$i$2, ..., v1$i$N}; generate a second group of M ZC sequences of length L based on the second root u2 and the jth cyclic shift list v2$j$={v2$j$1, v2$j$2, ..., v2$j$M}; and generating the preamble sequence by combining the first group of N ZC sequences, and the second group of M ZC sequences.

Clause 3. The plurality of roots u1, u2, u3, ..., and the plurality of cyclic shift lists sets corresponding to the plurality of roots, collectively uniquely identifies the preamble sequence from among a plurality of preamble sequences.

Clause 4. Any two cyclic shifts lists in a cyclic shift list set do not completely overlap with each other when a cyclic shift is applied to any one of the two cyclic shift lists.

Clause 5. The UE can generate a cyclic prefix (CP) by prepending a portion of the preamble sequence, where the portion is obtained from the tail of the preamble sequence. The UE can also generate a guard time interval (GT) to follow the prepended preamble sequence. The CP, preamble sequence, GT together define the preamble that the UE sends to the BS (e.g., PRACH preamble). The BS can send a timing advance value to the UE in response to receiving the random access preamble signal.

The wireless device (e.g., UE) or wireless node (e.g., base station) can include a processor configured to implement a method recited in any one or more of clauses above. Additionally, the UE or base station can include a computer program product comprising a computer-readable program medium having processor executable instructions stored thereon, the instructions, when executed by a processor, causing the processor to implement a method recited in any one or more of the clauses above.

Figure 12:
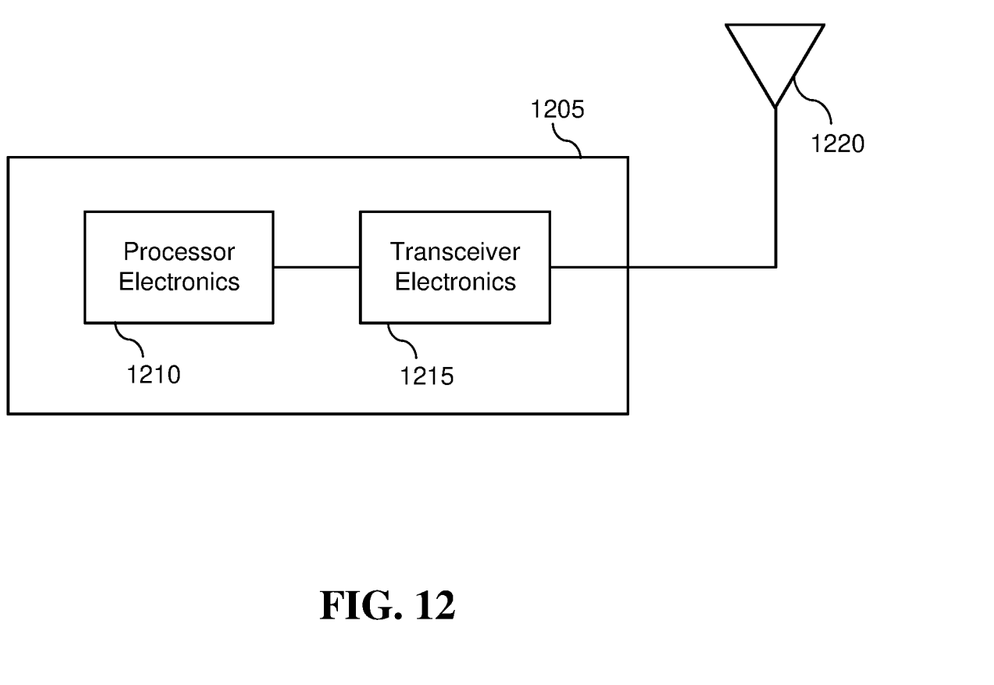
FIG. 12 is a block diagram representation of a portion of an apparatus, in accordance with some embodiments of the presently disclosed technology.

FIG. 12 is a block diagram representation of a portion of an apparatus, in accordance with some embodiments of the presently disclosed technology. An apparatus 1205, such as a base station or a wireless device (or UE), can include processor electronics 1210 such as a microprocessor that implements one or more of the techniques presented in this document. The apparatus 1205 can include transceiver electronics 1215 to send and/or receive wireless signals over one or more communication interfaces such as antenna(s) 1220. The apparatus 1205 can include other communication interfaces for transmitting and receiving data. Apparatus 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the apparatus 1205.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
    generating, by a wireless device, a preamble sequence by combining a plurality of Zadoff-Chu (ZC) sequences of a first length, wherein the plurality of ZC sequences is based on two or more roots including a first root and a second root different from the first root and a cyclic shift list per root, wherein each ZC sequence is based on a root of the two or more roots and a cyclic shift list corresponding to the root,
    wherein the generating the preamble sequence by combining the plurality of ZC sequences comprises:
    selecting the first root from the two or more roots and an ith cyclic shift list from a set of cyclic shift lists corresponding to the first root;
    selecting the second root from the two or more roots and a jth cyclic shift list from a set of cyclic shift lists corresponding to the second root, wherein an amount of cyclic shift between adjacent sequences in the ith cyclic shift list is different from an amount of cyclic shift between adjacent sequences in the jth cyclic shift list;
    generating a first group of ZC sequences based on the first root and the ith cyclic shift list; generating a second group of ZC sequences based on the second root and the jth cyclic shift list; and
    generating the preamble sequence by combining the first group of ZC sequences and the second group of ZC sequences; and
    generating, by the wireless device, a transmission waveform using the preamble sequence.

2. The method of claim 1, wherein the generating of the preamble sequence by combining the plurality of ZC sequences comprises:
    receiving a length of the ZC sequences, a plurality of roots including the two or more roots which include the first root and the second root, and a plurality of cyclic shift lists sets corresponding to the plurality of roots, wherein each cyclic shift lists set comprises a plurality of cyclic shift lists.

3. The method of claim 1, wherein the ith cyclic shift list corresponding to the first root comprises N cyclic shift values, wherein N is a positive integer, and the jth cyclic shift list corresponding to the second root comprises M cyclic shift values, wherein M is a positive integer.

4. The method of claim 2, wherein the plurality of roots and the plurality of cyclic shift lists sets corresponding to the plurality of roots, collectively uniquely identifies the preamble sequence from among a plurality of preamble sequences.

5. The method of claim 4, wherein any two cyclic shift lists in a cyclic shift lists set do not completely overlap with each other when a cyclic shift is applied to any one of the two cyclic shift lists.

6. The method of claim 1, further comprising:
generating a cyclic prefix by prepending a portion of the preamble sequence, wherein the portion is obtained from a tail of the preamble sequence; and
generating a guard time interval to follow the prepended preamble sequence.

7. The method of claim 1, wherein combining the first group of ZC sequences and the second group of ZC sequences comprises superposing the first group of ZC sequences and the second group of ZC sequences.

8. The method of claim 1, wherein combining the first group of ZC sequences and the second group of ZC sequences comprises concatenating and superposing the first group of ZC sequences and the second group of ZC sequences.

9. The method of claim 6, further comprising:
generating a random access preamble signal based on the cyclic prefix, the preamble sequence, and the guard time interval; and
transmitting the random access preamble signal to a wireless node.

10. The method of claim 9, further comprising receiving a timing advance value from the wireless node in response to transmitting the random access preamble signal to the wireless node.

11. A wireless communication apparatus comprising a processor configured to implement a method, comprising:
generating a preamble sequence by combining a plurality of Zadoff-Chu (ZC) sequences of a first length, wherein the plurality of ZC sequences is based on two or more roots including a first root and a second root different from the first root and a cyclic shift list per root,
wherein each ZC sequence is based on a root of the two or more roots and a cyclic shift list corresponding to the root, wherein the generating the preamble sequence by combining the plurality of ZC sequences comprises:
selecting the first root from the two or more roots and an ith cyclic shift list from a set of cyclic shift lists corresponding to the first root;
selecting the second root from the two or more roots and a jth cyclic shift list from a set of cyclic shift lists corresponding to the second root, wherein an amount of cyclic shift between adjacent sequences in the ith cyclic shift list is different from an amount of cyclic shift between adjacent sequences in the jth cyclic shift list;
generating a first group of ZC sequences based on the first root and the ith cyclic shift list; generating a second group of ZC sequences based on the second root and the jth cyclic shift list; and generating the preamble sequence by combining the first group of ZC sequences and the second group of ZC sequences; and
generating a transmission waveform using the preamble sequence.

12. The apparatus of claim 11, wherein the generating of the preamble sequence by combining the plurality of ZC sequences comprises:
receiving a length of the ZC sequences, a plurality of roots including the two or more roots which include the first root and the second root, and a plurality of cyclic shift lists sets corresponding to the plurality of roots, wherein each cyclic shift lists set comprises a plurality of cyclic shift lists.

13. The apparatus of claim 11, wherein the ith cyclic shift list corresponding to the first root comprises N cyclic shift values, wherein N is a positive integer, and the jth cyclic shift list corresponding to the second root comprises M cyclic shift values, wherein M is a positive integer.

14. The apparatus of claim 11, wherein the method further comprises:
generating a cyclic prefix by prepending a portion of the preamble sequence, wherein the portion is obtained from a tail of the preamble sequence; and
generating a guard time interval to follow the prepended preamble sequence.

15. The apparatus of claim 11, wherein combining the first group of ZC sequences and the second group of ZC sequences comprises superposing the first group of ZC sequences and the second group of ZC sequences.

16. The apparatus of claim 11, wherein combining the first group of ZC sequences and the second group of ZC sequences comprises concatenating and superposing the first group of ZC sequences and the second group of ZC sequences.

* * * * *